United States Patent
Chan et al.

(10) Patent No.: US 8,014,981 B2
(45) Date of Patent: Sep. 6, 2011

(54) ANGULAR-DOMAIN CHANNEL MODEL AND CHANNEL ESTIMATION

(75) Inventors: Peter Wing Chau Chan, Hong Kong (HK); Derek Chun Kit Lee, Hong Kong (HK); Roger Shu Kwan Cheng, Hong Kong (HK); Chih-Lin I, Hong Kong (HK)

(73) Assignee: Hong Kong Applied Science and Technology Research Institute Company Limited, New Territories (HK)

( * ) Notice: Subject to any disclaimer, the term of this patent is extended or adjusted under 35 U.S.C. 154(b) by 677 days.

(21) Appl. No.: 12/128,729

(22) Filed: May 29, 2008

(65) Prior Publication Data
US 2009/0299715 A1 Dec. 3, 2009

(51) Int. Cl.
*G06F 7/60* (2006.01)
*G06F 17/50* (2006.01)
(52) U.S. Cl. .............................. 703/2; 703/13
(58) Field of Classification Search .............. 703/2, 13; 375/295, 315, 316, 349
See application file for complete search history.

(56) References Cited

U.S. PATENT DOCUMENTS
| | | | |
|---|---|---|---|
| 6,463,099 B1 * | 10/2002 | Cao et al. ....................... | 375/232 |
| 2007/0147329 A1 * | 6/2007 | Soriaga et al. ................ | 370/342 |
| 2007/0243827 A1 * | 10/2007 | Sayeed et al. ............. | 455/67.11 |

OTHER PUBLICATIONS

Chan et al. "Angular-domain Channel Model and Channel Estimation for MIMO system", IEEE., 2008. p. 1-5.*
Almers, P. et al.; "Survey of Channel and Radio Propagation Models for Wireless Mimo Systems," EURASIP Journal on Wireless Communications and Networking, Hindawi Publishing Corporation, vol. 2007, Article ID 19070, 19 pgs.
Bonek, Ernst; "The MIMO Radio Channel," Proc. Antenn 06 Nordic Antenna Symposium, pp. 23-34, Linköping, Schweden, May 2006, 12 pgs.
Özcelik, Hüseyin, et al."What Makes a Good MIMO Channel Model," in Proc. Proceedings of the 61st Semiannual Vehicular Technology Conference, Stockholm, Schweden, May 2005, 5 pgs.
Poon, Ada S. et al., "Degrees of Freedom in Multiple-Antenna Channels:A Signal Space Approach,"IEEE Transactions on Information Theory,vol. 51, No. 2, Feb. 2005, pp. 523-536.
Sayeed, Akbar M., "Deconstructing Multiantenna Fading Channels," IEEE Transactions on Signal Processing, vol. 50, No. 10, Oct. 2002, pp. 2563-2579.
Steinbauer, Martin et al, "The Double-Directional Radio Channel," IEEE Antennas and Propagation Magazine, vol. 43, No. 4, Aug. 2001, pp. 51-63.

* cited by examiner

*Primary Examiner* — Paul Rodriguez
*Assistant Examiner* — Eun Kim
(74) *Attorney, Agent, or Firm* — Ella Cheong Hong Kong; Margaret A. Burke; Sam T. Yip

(57) ABSTRACT

A method of modeling wireless communication channels in angular domain is disclosed. The method includes considering radiation patterns 101, 102 of the transmitter antenna and the receiver antenna, wherein the radiation patterns are represented by antenna characteristics sampled at a plurality of angular directions. A method of channel estimation based on the method of modeling wireless communication channel in angular domain is also disclosed.

20 Claims, 4 Drawing Sheets

ANGULAR-DOMAIN CHANNEL MODEL AND CHANNEL ESTIMATION

TECHNICAL FIELD

The presently claimed invention relates generally to wireless communication systems. More particularly, aspects of the claimed invention relate to modeling the channel in a wireless communication system.

BACKGROUND

The use of a multiple-input-multiple-output (MIMO) channel has been widely adopted in wireless communication system due to the promising capacity gain of a multi-antenna system. Known methods of modeling the channel assume the channel to be independent and identically distributed (i.i.d.) but in fact the MIMO channel is generally correlated because the environment is not rich scattering or the antennas are not widely separated or mutual coupling exists among antennas. This is especially common for terminal devices with small form factor. As a result, known models cannot represent the channels accurately and algorithm performances are limited by these inaccurate channel models.

Therefore, the art would benefit greatly from improved channel modeling which can provide accurate description of the channel behavior.

SUMMARY

In multiple antenna wireless system such as MIMO (multiple-input and multiple-output) systems, conventional channel estimation is usually carried out by modeling the channel in array domain (i.e., modeling the antenna-to-antenna channel gains directly). For example, i.i.d. channel model represents the channel behavior as the channel gain between any transmit-receive antenna pair being independent random variables. However, array-domain modeling is inaccurate in representing the channel behavior. Inaccurate channel models result in analyses which are not valid in the reality. As illustrated below, the mathematical model for array-domain modeling usually assumes an unnecessarily larger degree of freedom in the channel matrix and estimates more unknowns than necessary. The degree of freedom of the channel is in fact governed by the number of physical clusters, each of which results from scatterers and reflectors, in the channel. Each cluster dictates the gain or attenuation of the signal transmitted to a particular angle of departure and received from a particular angle of arrival. While the independence among the pairwise gains of transmit-receive antennas cannot be justified in most practical scenarios, the physical clusters are much more justifiably independent. Moreover, the number of dominant physical clusters is limited in the physical channel, regardless of the number of antennas employed in the transmitter and receiver, and hence can be much fewer than the elements of the channel matrix.

The presently claimed invention provides a method of modeling the virtual clusters instead of modeling the physical cluster directly, each of the virtual clusters dictates the gain or attenuation of signal transmitted to a particular beam (a set of angles) of departure and received from beam of arrival. The number of virtual clusters will still be smaller than the number of channel matrix elements, provided that the number of antennas is moderately large. A simple analogy of the above concept can be easily drawn with the time-domain multi-path channel model. While in frequency domain, a multi-path channel appears to have non-zero, different but correlated gains along the whole band and whose relationship or correlation is not apparent, it may be represented accurately by few impulses (analogous to physical cluster) in time-domain. Hence, time-domain is a better coordinate than frequency domain to represent the multi-path channel in reality. Since in digital systems, the received signal is sampled with finite sampling frequency and finite bandwidth, the effective channel perceived by the system is not the continuous channel with infinite temporal resolution, but a filtered channel. As a result, the effective channel is discrete in time and each impulse in the physical channel may leak its energy into multiple taps in the discrete-time domain perceived by the system. These taps in discrete-time domain are analogous to the virtual clusters in our model. And still, for example, in OFDM system, the number of such taps with dominant channel power, is only a portion of the number of subcarriers, and hence channel estimation performed based on time-domain model needs to estimate much fewer unknowns than in frequency-domain (treating each subcarrier as a random variable or unknown) in general.

In short, aspects of the claimed invention improve channel estimation by modeling the channel in angular domain, which is a better coordinate to physically interpret propagation channels with multiple antennas. More realistic channel models can be developed from the angular domain. Since the angular-domain model reflects the real electromagnetic wave propagation phenomenon, it can represent the real physical channel more accurately.

Such better channel model allows researchers to perform more appropriate analysis on the real channel and enable improved performance of a wireless communication system with multiple antennas, for example, MIMO system. Besides channel estimation, a better channel model in angular domain also helps implement transmission and reception strategy when perfect channel state information is not available, including: spatial preceding, beamforming, opportunistic beamforming, space division multiple access (SDMA), space-time, space-frequency-time or space-frequency-time coding, channel equalization, and interference rejection/suppression.

Known methods of channel estimation in array domain also suffer from training overhead which increases proportionally with the number of transmit antennas. In high mobility scenario where channel varies rapidly, even more training overhead is required to maintain the performance. Moreover, lots of algorithms and modules in MIMO communication system rely on accurate channel estimation, for example, SDMA demands high channel estimation accuracy. All these issues become serious concerns especially in leading edge wireless communication systems, such as 4G communication systems: WiMAX (Worldwide Interoperability for Microwave Access) and LTE (Long Term Evolution).

Compared to array-domain modeling, angular-domain modeling provides better channel estimation algorithm with reduced overhead for the same estimation accuracy. In particular, the overall channel estimation takes into account of transmit and receive antenna patterns in addition to the propagation channel. By incorporating information of the actual or practical antenna patterns into the channel model, channel characteristics due to variation of actual antenna pattern can be reflected accurately.

The channel model according to the claimed invention has a nice form to separate antenna patterns from the propagation channel, and shed some light on what a desirable antenna should be, in terms of system performance. For example, antenna designer may want to optimize the design such that receiver antenna pattern, $A_r$ is unitary, so that the antenna pattern would not introduce noise amplification when the receiver employs zero-forcing demodulation, by multiplying $A_r^{-1}$ on the received signal. The channel model also provides some guidance for antenna design in view of system design.

Accordingly, several aspects of the invention have been developed with a view to substantially reduce or eliminate the drawbacks described hereinbefore and known to those skilled in the art and to provide channel models in angular domain that may be adopted to offer more accurate channel estimation. In certain embodiments, the method of modeling wireless communication channel in angular domain includes considering radiation patterns of the transmitter antenna and the receiver antenna, wherein the radiation patterns are represented by antenna characteristics sampled at a plurality of angular directions.

Advantageously, in certain embodiments, the method of modeling channel also includes sampling the radiation patterns of antennas such as $$a_{ij} = a_i\left(\frac{2\pi(j-1)}{M}\right),$$

where $a_{ij}$ is the j-th basis signal of $a_i(\theta)$; $a_i(\theta)$ is the radiation pattern of the i-th antenna element; and M is the number of samples acquired. The radiation patterns of antennas at a remote communication device may be conveyed by said remote communication device. The radiation patterns of antennas may also be estimated based on given channel statistics.

In an exemplary embodiment, minimum-mean-square-error estimation is used in the channel estimation, based on the proposed model. The proposed channel model may also be used in estimating radiation patterns of antennas by blind estimation based on statistics of antenna pattern or assumptions on statistics of antenna pattern.

The signal output by a receiver is mathematically expressed as: $Y = A_r H_B A_t^T X + W$, where $A_r$ is the radiation pattern of the receiver antenna; $A_t$ is the radiation pattern of the transmit antenna; X is the input signal; $H_B$ is the channel model; and W is the noise.

Advantageously, each element in said channel model $H_B$ represents channel response between a corresponding set of angles (essentially a beam) of departure from the transmitter to a corresponding set of angles (essentially a beam) of arrival at the receiver.

The channel response may be a single path response or a multi-path response.

In one embodiment of the claimed invention, the antenna patterns and channel model are represented as separable linear processes. In a further embodiment, the radiation pattern of each antenna element may be presumed to be omnidirectional.

Other aspects of the invention are also disclosed.

BRIEF DESCRIPTION OF DRAWINGS

Embodiments of the invention are described in more detail hereinafter with reference to the drawings, in which.

DETAILED DESCRIPTION

Improved methods for channel modeling and corresponding methods of channel estimation are disclosed herein. In the following description, numerous specific details, including antenna parameters, antenna types, antenna patterns, channels characteristics, and the like are set forth. However, from this disclosure, it will be apparent to those skilled in the art that modifications, including additions and/or substitutions may be made without departing from the scope and spirit of the claimed invention. In other circumstances, specific details may be omitted so as not to obscure the claimed invention. Nonetheless, the disclosure is written as to enable one skilled in the art to practice the teachings of the embodiments of the invention without undo experimentation.

Figure 1:
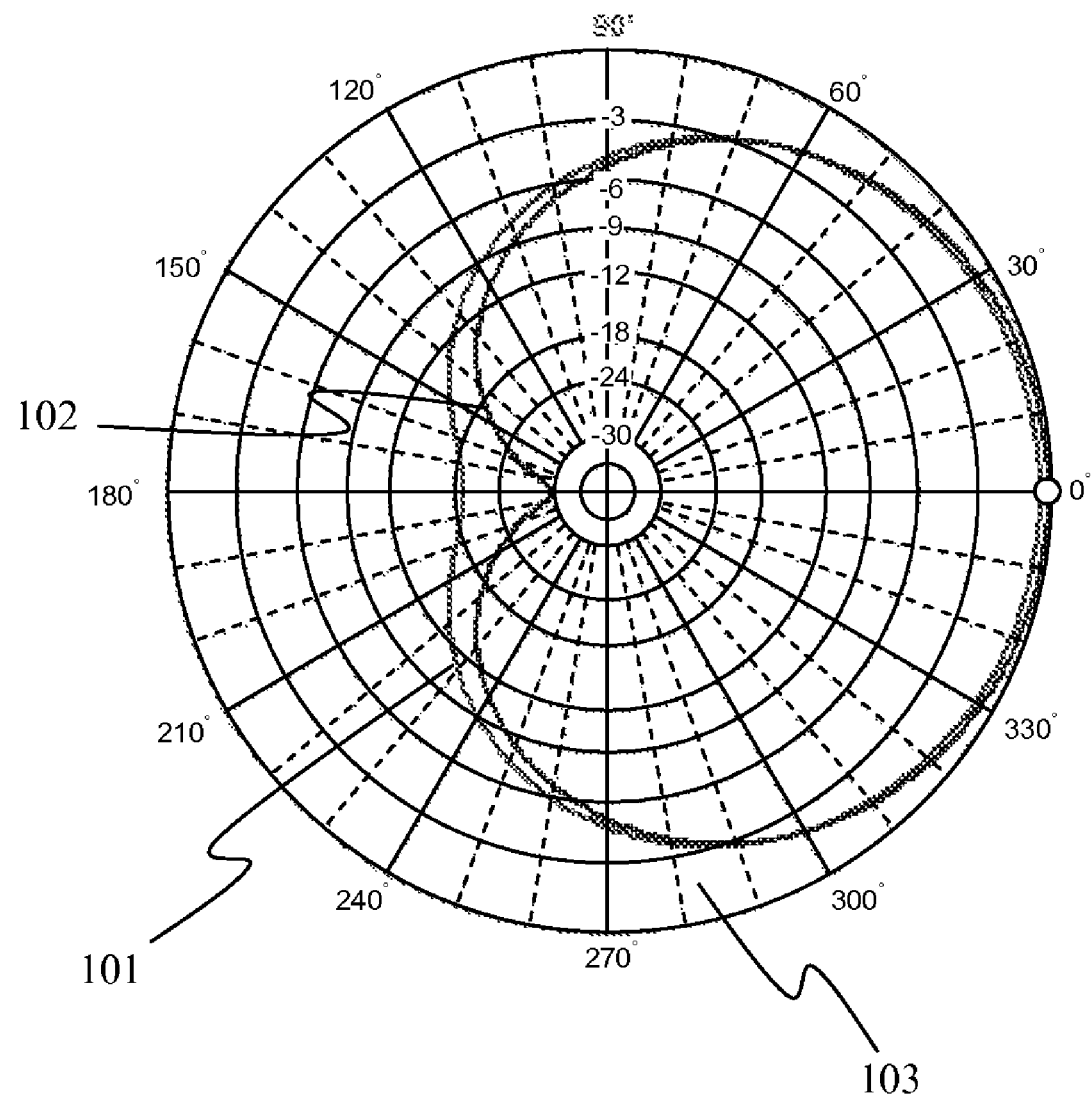
FIG. 1 shows an exemplary antenna radiation pattern sampled in angular domain according to an embodiment of the claimed invention.

According to an embodiment of the claimed invention, an antenna-pattern-based angular domain channel model is described by $$H = A_r(\Omega \otimes G)A_t^T,$$

where $A_r$ is the receiver antenna pattern matrix
$A_t$ is the transmitter antenna pattern matrix
$\Omega$ is the power-angle-profile matrix, whose (i,j)-th element represents the channel power from the j-th transmit beam to the i-th receive beam. Like power-delay-profile, this is a long-term statistic and does not vary with channel rapidly and can be obtained by estimation.
G is a matrix whose elements are identically are independently distributed unit variance complex Gaussian random variable The channel model, H is fully characterized by antenna patterns $A_r$, $A_t$ which can be obtained by measurement or estimation. FIG. 1 shows exemplary antenna radiation patterns 101, 102 sampled in angular domain 103. The antenna patterns 101, 102 are represented as periodic signal in angular domain 103 with period $2\pi$.

The radiation pattern of an antenna is a limited geometry, meaning that it is a pattern bounded in finite space. Accordingly, the antenna pattern can be viewed as a signal which can be perfectly represented with samples with sufficiently large sampling frequency under sampling theory:

$$a(\theta) = [\, a_1(\theta) \quad \ldots \quad a_N(\theta)\,]^T$$

$$a_i(\theta) = \sum_{j=1}^{M} a_{ij} f_j(\theta)$$

where $$\int_0^{2\pi} f_j(\theta) f_k(\theta) d\theta = \begin{cases} 1, & \text{if } j = k \\ 0, & \text{if } j \neq k \end{cases}$$

Following the sampling theorem, $a_{ij}$ are simply the samples of the radiation pattern such that $$a_{ij} = a_i\left(\frac{2\pi(j-1)}{M}\right),$$

where $a_{ij}$ is the j-th basis signal of $a_i(\theta)$; $a_i(\theta)$ is the radiation pattern of the i-th antenna element; and M is the number of samples acquired.

Figure 2:
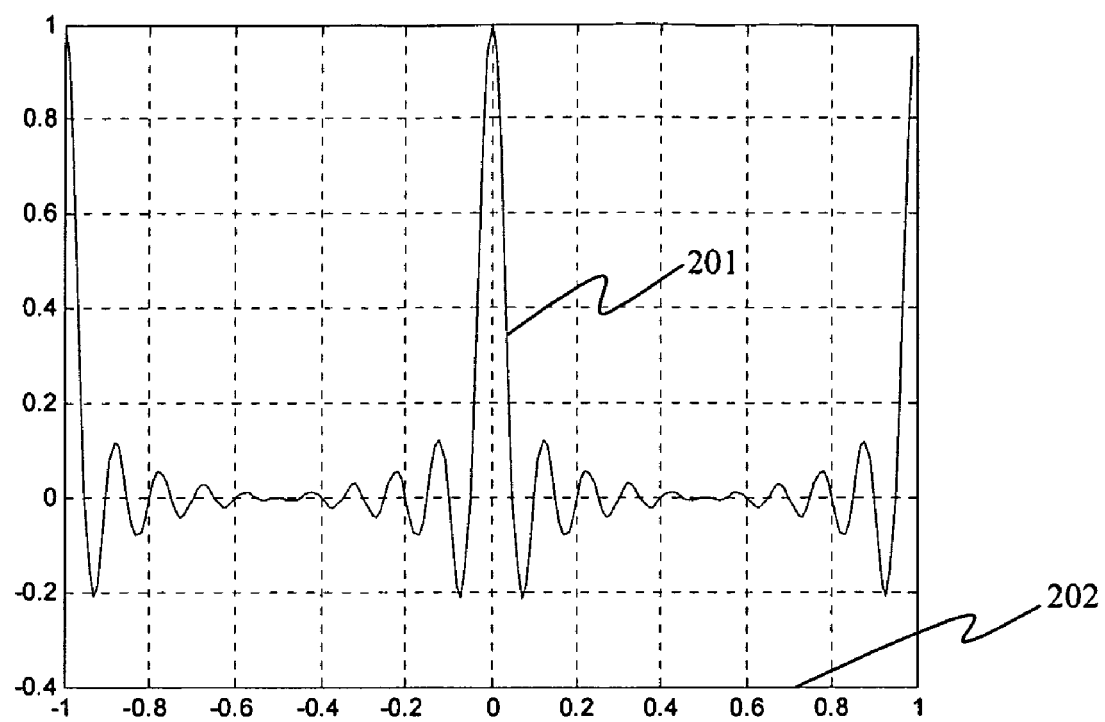
FIG. 2 shows a periodic since function for sampling antenna pattern in angular domain according to an embodiment of the claimed invention.

FIG. 2 shows a periodic since function 201 as sampling function $f_j$ for sampling antenna pattern in angular domain 202 according to an embodiment of the claimed invention. With M, the amount of sampled values, being sufficiently large, the antenna pattern can be represented accurately in the angular domain.

Assuming incoming waves $s(\theta)$ is being transmitted in a communication system and $s(\theta)$ is represented in the angular domain as:

$$s(\theta) = \sum_{j=1}^{M} s_j f_j(\theta)$$

Since an antenna can be considered as a linear filter in angular domain, after being transmitted by the transmitter antenna and propagating through the channel, the signal output by the i-th receiver antenna is:

$$y_i = \int_0^{2\pi} s(\theta) a_i(\theta) d\theta$$
$$= \int_0^{2\pi} \left(\sum_{j=1}^{M} s_j f_j(\theta)\right)\left(\sum_{k=1}^{M} a_{ik} f_k(\theta)\right) d\theta$$
$$= a_i^T s$$

The above equations can be rewritten as matrix form:

$$a_i(\theta) \to a_i = [a_{i1} \ \ldots \ a_{iM}]^T$$
$$s(\theta) \to s = [s_1 \ \ldots \ s_M]^T$$
$$y = \begin{bmatrix} a_1^T \\ \vdots \\ a_N^T \end{bmatrix} s = As = U\Lambda V^H s = U\tilde{\Lambda}\tilde{V}^H s = U\tilde{\Lambda}\tilde{s}$$

The second line of the above calculation is obtained by performing singular value decomposition on A, where U and V are unitary matrix. The matrices $\tilde{\Lambda}$ and $\tilde{V}$ are obtained by removing the zero columns of $\Lambda$ and V respectively. Please note that $\Lambda$ has N diagonal singular values only, and hence the last M-N columns are zero columns.

where $A=U\Lambda V^H$ $\tilde{s}=\tilde{V}^H s$ are signals represented in Beam Pattern (or angular) domain.

If the incoming waves from different AoAs/AoDs are uncorrelated:

$$E[ss^H] = I_M \Rightarrow E[\tilde{s}\tilde{s}^H] = \tilde{V}^H \tilde{V} = I_N$$

The transformed signals are also uncorrelated.
Therefore, the overall channel model can be expressed as:

$$H = U_r \tilde{\Lambda}_r H^A \tilde{\Lambda}_t^T U_t^T = A_r(\Omega \otimes G) A_t^T$$

where the antenna patterns can be obtained by measuring $a_{r,i}(\theta)$ and $a_{t,i}(\theta)$:

$$A_r = U_r \tilde{A}_r$$
$$A_t = U_t \tilde{A}_t$$

Figure 3:
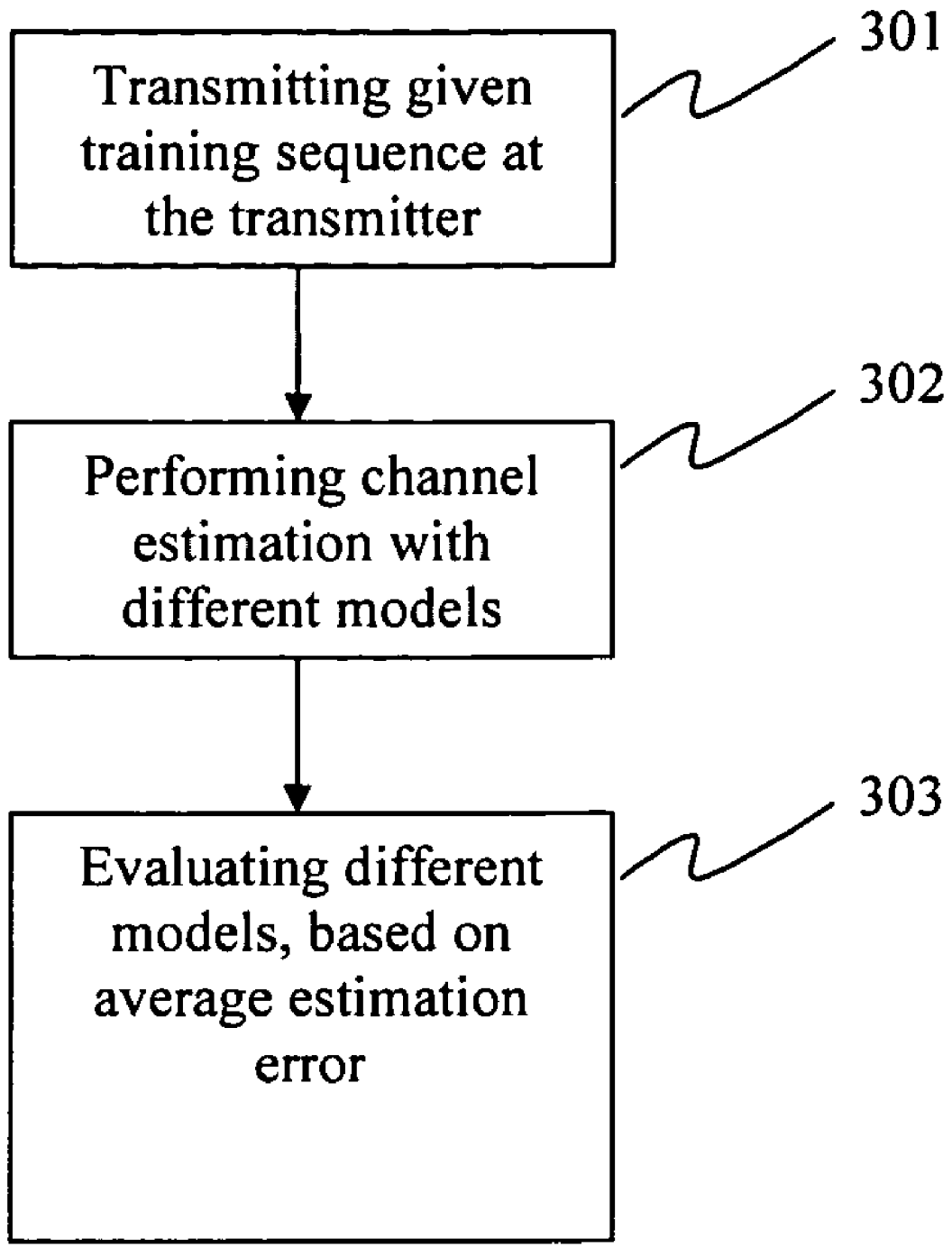
FIG. 3 shows a flow diagram for validating channel-estimation-based model according to embodiments of the claimed invention.

FIG. 3 shows a flow diagram for validating channel-estimation-based model according to an embodiment of the claimed invention. Known methods of validating channel models are usually performed based on aggregate statistics, for example: ergodic capacity, and diversity order. However, considering along the foregoing conditions is far from sufficient to perform reliable validation. According to an embodiment of the claimed invention, channel estimation error comparison is made to validate the channel models. In step 301, limited amount of training resources (or training sequence X, the dimension of which is Nt×T, assuming T training symbols are transmitted; Similarly, Y and W are of dimension Nr×T; Ar is of dimension Nr×Nr; At is of dimension Nt×Nt; HA is of dimension Nr×Nt.) is given and transmitted at the transmitter. The signal output at the receiver end according to the angular-domain channel model in the claimed invention is $$Y = A_r H_A A_t^T X + W$$

In step 302, channel estimation is performed by, for example, a MMSE (Minimum-Mean-Square-Error) Channel Estimator:

$$\hat{h}_A = vec(\hat{H}_A) = R_{h_A} B^H (BR_{h_A} B^H + \sigma^2 I_{N_r T})^{-1} vec(Y)$$

where $B = (X^T A_t) \otimes A_r$;
$\hat{H}_A$ is the estimate of $H_A$; and
$R_{h_A} = E[h_A h_A^H]$ is the correlation matrix of $h_A$.
Since $$R_y = E[vec(Y) vec(Y)^H] = BR_{h_A} B^H + \sigma^2 I_{N_r T}$$

One way to estimate $R_{h_A}$ is from the sample correlation matrix $\hat{R}_y$ by $$\hat{R}_{h_A} = B^+(\hat{R}_y - \sigma^2 I_{N_r T}) B^{+H}$$

where $^+$ denotes pseudo-inverse;
$\sigma^2$ is the noise variance;

$$B = (X^T A_t) \otimes A_r$$
$$= U_B \Lambda_B V_B^H$$
$$= \tilde{U}_B \tilde{\Lambda}_B V_B^H; \text{ and}$$
$$B^+ = V_B \tilde{\Lambda}_B^{-1} \tilde{U}_B^H.$$

Assuming $T \geq N_t$, $$\Lambda = [\tilde{\Lambda}_B^T 0]^T$$

$$U_B = [\tilde{U}_B 0]$$

$\hat{R}_y$ is the sample correlation matrix, obtained by measuring the temporal average of $yy^H$, where $y = vec(Y)$.

Ideally, a good channel model should minimize the channel estimation error.

In step 303, the average channel estimation error is computed either from analysis or simulation. The accuracy of the model is evaluated by the average channel estimation error.

As an objective of the claimed invention, as the error is made smaller the accuracy increases.

According to one embodiment of the claimed invention, some presumed antenna patterns chosen with reasonable grounds, such as an omnidirectional pattern on those antenna elements, is substituted as the unknown antenna patterns when some antenna patterns on the transmitter side or receiver side is not known a priori. This is common if the transmitter and receiver devices are from different vendors, or there are various models of devices. Usually, the local side may have a priori information of antenna patterns, but not that of the remote side. By substituting with presumed antenna patterns, the lack of the realistic antenna pattern will not make the model completely fail (e.g. even i.i.d. channel model can function), but only less accurate compared to the scenario having known antenna patterns on both sides. The a priori information of antenna pattern on one side still improves the channel model accuracy, compared to cases where no information is available at all.

Compared to other patterns, the choice of omnidirectional pattern is relatively "robust" to many circumstances, since it does not presume particular directivity and is unbiased to all directions.

In another embodiment of the claimed invention, other antenna radiation patterns are chosen based on specific circumstances in that type of systems. For example, in applications like satellite transmission where the antennas are known to be highly directive, some other antenna patterns with high directivity is preferably used as the presumed antenna patterns.

According to a further embodiment of the claimed invention, information of the antenna pattern unknown to one side is conveyed from the other side. For example, the base station may broadcast information of its antenna pattern to the terminals for them to adjust the channel model used by each terminal. In one exemplary embodiment, the radiation pattern of an individual antenna at the remote side is conveyed to the local side. In another exemplary embodiment, the radiation pattern of all antennas at the remote side as a whole is conveyed to the local side.

According to yet another embodiment, pilot or training symbols are used to estimate the unknown antenna pattern when propagation channel or its statistics has become known.

According to an embodiment of the claimed invention, the algorithm for channel estimation resides in an integrated circuit. When the antenna for the wireless product is determined, the corresponding antenna pattern can be programmed into the integrated circuit such that the algorithm can estimate the channel with the practical antenna pattern. The customization of antenna patterns can be done with respect to each individual antenna, or to a group of antenna considered as a whole. This allows a preset algorithm in the integrated circuit to achieve better performance by adapting to the input antenna pattern. According to another embodiment of the claimed invention, a predetermined antenna pattern is built in the integrated circuit as a default antenna pattern.

Figure 4:
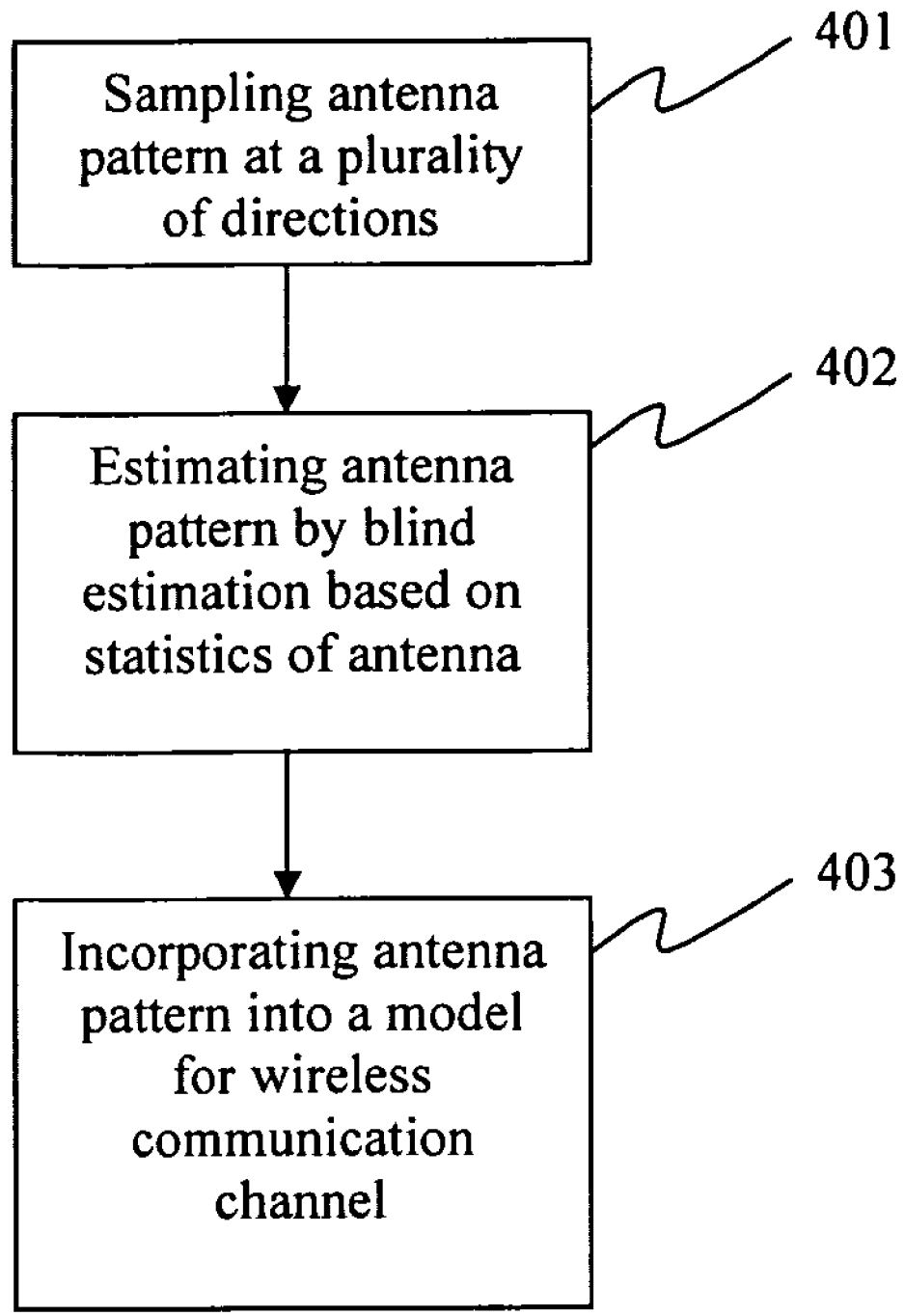
FIG. 4 shows a flow diagram for methods of wireless communication channel modeling.

FIG. 4 shows a flow diagram for methods of wireless communication channel modeling. In the claimed invention, the wireless communication channel in angular domain is modeled by including the steps of representing 401 radiation patterns of at least one transmitter antenna and at least one receiver antenna by antenna characteristics sampled at a plurality of angular directions, optionally estimating 402 radiation patterns of antennas by blind estimation based on statistics of antenna pattern or assumptions on statistics of antenna pattern, and incorporating 403 said radiation patterns of at least one transmitter antenna and at least one receiver antenna into a model for wireless communication channel.

The foregoing description of embodiments of the present invention are not exhaustive and any update or modifications to them are obvious to those skilled in the art, and therefore reference is made to the appending claims for determining the scope of the present invention.

We claim:

1. A method of modeling wireless communication channel in angular domain, comprising:
    representing radiation patterns of at least one transmitter antenna and at least one receiver antenna by antenna characteristics sampled at a plurality of angular directions; and
    incorporating said radiation patterns of at least one transmitter antenna and at least one receiver antenna into a model for wireless communication channel;
    wherein the radiation patterns and channel model are separable linear processes and the signal output by a receiver is mathematically expressed as:

$$Y = A_r H_A A_t^T X + W,$$

where $A_r$ is the radiation pattern of the receiver antenna;
    $A_t$ is the radiation pattern of the transmitter antenna;
    $A_t^T$ is the transpose of $A_t$;
    X is the input signal;
    $H_A$ is the channel model; and
    W is the noise;
    the modeling being implemented in or by a device in a wireless communication system.

2. The method of modeling wireless communication channel according to claim 1, wherein a channel model is represented in angular domain as:

$$H = A_r (\Omega \otimes G) A_t^T,$$

where $A_r$ is a receiver antenna pattern matrix;
    $A_t$ is a transmitter antenna pattern matrix;
    $A_t^T$ is the transpose of $A_t$;
    $\Omega$ is a power-angle-profile matrix, whose (i,j)-th element represents channel power from the j-th transmit beam to the i-th receive beam;
    G is a matrix whose elements are identically and independently distributed unit variance complex Gaussian random variable.

3. The method of modeling wireless communication channel according to claim 1, further comprising sampling said radiation patterns of antennas such that $$a_{ij} = a_i\left(\frac{2\pi(j-1)}{M}\right),$$

where $a_{ij}$ is the j-th basis signal of $a_i(\theta)$;
    $a_i(\theta)$ is the radiation pattern of the i-th antenna element; and
    M is the number of samples acquired.

4. The method of modeling wireless communication channel according to claim 1, wherein said radiation patterns of antennas at a remote communication device are conveyed by said remote communication device.

5. The method of modeling wireless communication channel according to claim 1, wherein said radiation patterns of antennas are estimated based on given channel statistics.

6. The method of modeling wireless communication channel according to claim 1, further comprising estimating radiation patterns of antennas by blind estimation based on statistics of antenna pattern or assumptions on statistics of antenna pattern.

7. The method of modeling wireless communication channel according to claim 1, wherein each element in said channel model $H_A$ represents channel response between a corresponding set of angles of departing the transmitter to a corresponding set of angles of arriving the receiver.

8. The method of modeling wireless communication channel according to claim 7, wherein said channel response is a single path response.

9. The method of modeling wireless communication channel according to claim 7, wherein said channel response is a multi-path response.

10. The method of modeling wireless communication channel according to claim 1, wherein the radiation pattern of each antenna element is presumed to be omnidirectional.

11. A method of channel estimation for a wireless communication channel by modeling wireless communication channel in angular domain; said channel estimation of wireless communication channel comprising the steps of:
representing radiation patterns of at least one transmitter antenna and at least one receiver antenna by antenna characteristics sampled at a plurality of angular directions; and
incorporating said radiation patterns of at least one transmitter antenna and at least one receiver antenna into a model for wireless communication channel;
wherein signal output by a receiver is mathematically expressed as:

$$Y=A_r H_A A_t^T X + W,$$

where $A_r$ is the radiation pattern of the receiver antenna;
$A_t$ is the radiation pattern of the transmitter antenna;
$A_t^T$ is the transpose of $A_t$;
X is the input signal; $H_A$ is the channel model; and
W is the noise;
the channel estimation being implemented in or by a device in a wireless communication system.

12. The method of channel estimation for a wireless communication channel according to claim 11, wherein said wireless communication channel in angular domain is modeled as:

$$H = A_r (\Omega \otimes G) A_t^T,$$

where $A_r$ is a receiver antenna pattern matrix;
$A_t$ is a transmitter antenna pattern matrix;
$A_t^T$ is the transpose of $A_t$;
$\Omega$ is a power-angle-profile matrix, whose (i,j)-th element represents channel power from the j-th transmit beam to the i-th receive beam;
G is a matrix whose elements are identically and independently distributed unit variance complex Gaussian random variable.

13. The method of channel estimation according to claim 12, further comprising sampling said radiation patterns of antennas such that $$a_{ij} = a_i\left(\frac{2\pi(j-1)}{M}\right),$$

where $a_{ij}$ is the j-th basis signal of $a_i(\theta)$;
$a_i(\theta)$ is the radiation pattern of the i-th antenna element; and
M is the number of samples acquired.

14. The method of channel estimation according to claim 13, further comprising calculating MMSE (Minimum-Mean-Square-Error) channel estimator, represented by:

$$\hat{h}_A = R_{h_A} B^H (B R_{h_A} B^H + \sigma^2 I_{N_r T})^{-1} \text{vec}(Y),$$

where $\hat{h}_A = \text{vec}(\hat{H}_A)$;
$\hat{H}_A$ is the estimate of $H_A$;
$B = (X^T A_t) \otimes A_r$;
$B^H$ is the Hermitian of B;
vec(Y) is the vectorization of Y;
$R_{h_A} = E[h_A h_A^H]$; and
$I_{N_r T}$ is the identity matrix of size $N_r T \times N_r T$.

15. The method of channel estimation according to claim 12, further comprising calculating MMSE (Minimum-Mean-Square-Error) channel estimator, represented by:

$$\hat{h}_A = R_{h_A} B^H (B R_{h_A} B^H + \sigma^2 I_{N_r T})^{-1} \text{vec}(Y),$$

where $\hat{h}_A = \text{vec}(\hat{H}_A)$;
$\hat{H}_A$ is the estimate of $H_A$;
$B = (X^T A_t) \otimes A_r$;
$B^H$ is the Hermitian of B;
vec(Y) is the vectorization of Y;
$R_{h_A} = E[h_A h_A^H]$; and
$I_{N_r T}$ is the identity matrix of size $N_r T \times N_r T$.

16. The method of channel estimation according to claim 15, further comprising estimating $R_{h_A}$ from the sample correlation matrix of $\hat{R}_y$ by:

$$\hat{R}_{h_A} = B^+ (\hat{R}_y - \sigma^2 I_{N_r T}) B^{+H}$$

where $^+$ denotes pseudo-inverse;
$\sigma^2$ is the noise variance;
$R_{h_A} = E[h_A h_A^H]$;
$B^{+H} = (B^+)^H$, denoting the Hermitian of the pseudo-inverse of B ; and
$I_{N_r T}$ is the identity matrix of size $N_r T \times N_r T$.

17. A method of modeling wireless communication channel in angular domain, comprising:
representing radiation patterns of at least one transmitter antenna and at least one receiver antenna by antenna characteristics sampled at a plurality of angular directions;
incorporating said radiation patterns of at least one transmitter antenna and at least one receiver antenna into a model for wireless communication channel; and
sampling said radiation patterns of antennas such that $$a_{ij} = a_i\left(\frac{2\pi(j-1)}{M}\right),$$

where $a_{ij}$ is the j-th basis signal of $a_i(\theta)$;
$a_i(\theta)$ is the radiation pattern of the i-th antenna element; and
M is the number of samples acquired;
the modeling being implemented in or by a device in a wireless communication system.

18. The method of modeling wireless communication channel according to claim 17, wherein the radiation patterns and channel model are separable linear processes and the signal output by a receiver is mathematically expressed as:

$$Y = A_r H_A A_t^T X + W,$$

where $A_r$ is the radiation pattern of the receiver antenna;
$A_t$ is the radiation pattern of the transmitter antenna;
$A_t^T$ is the transpose of $A_t$;
X is the input signal;
$H_A$ is the channel model; and
W is the noise.

19. The method of modeling wireless communication channel according to claim 18, wherein a channel model is represented in angular domain as:

$$H = A_r (\Omega \otimes G) A_t^T,$$

where $A_r$ is a receiver antenna pattern matrix;
$A_t$ is a transmitter antenna pattern matrix;
$A_t^T$ is the transpose of $A_t$;
$\Omega$ is a power-angle-profile matrix, whose (i,j)-th element represents channel power from the j-th transmit beam to the i-th receive beam;
G is a matrix whose elements are identically and independently distributed unit variance complex Gaussian random variable.

20. The method of modeling wireless communication channel according to claim 19, wherein the radiation pattern of each antenna element is presumed to be omnidirectional.

* * * * *